(No Model.)
H. FRASCH.
COMPOSITION FOR PURIFYING CANADIAN OR SIMILAR PETROLEUM AND PROCESS OF MAKING SUCH COMPOSITION.
No. 500,252.  Patented June 27, 1893.
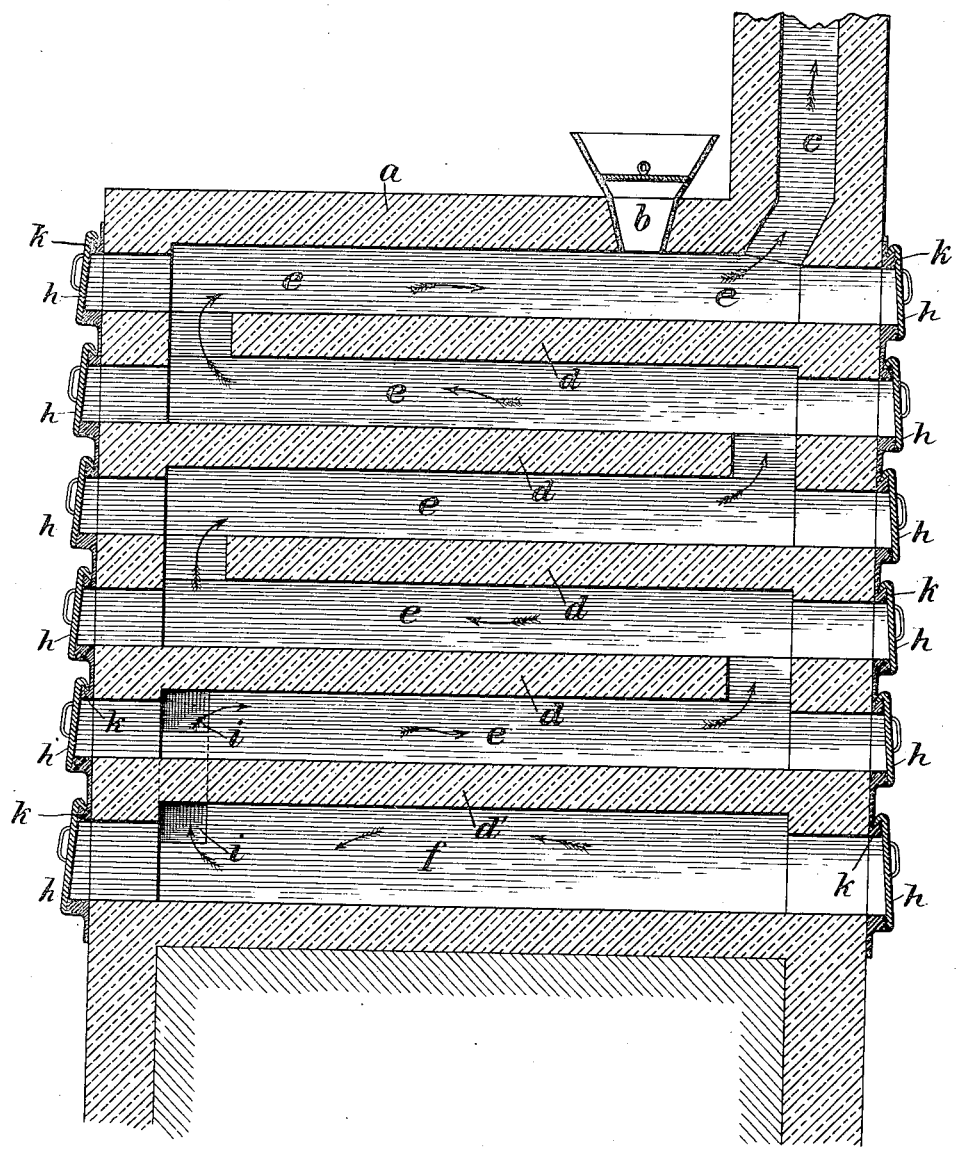
WITNESSES.
Philip Mauro
Fred E. Tasker.
INVENTOR.
Herman Frasch
By Chas. J. Hedrick
his attorney

UNITED STATES PATENT OFFICE.

HERMAN FRASCH, OF CLEVELAND, OHIO, ASSIGNOR TO THE SOLAR REFINING COMPANY, OF OHIO.

COMPOSITION FOR PURIFYING CANADIAN OR SIMILAR PETROLEUM AND PROCESS OF MAKING SUCH COMPOSITION.

SPECIFICATION forming part of Letters Patent No. 500,252, dated June 27, 1893.

Application filed September 7, 1888. Serial No. 284,830. (No specimens.)

*To all whom it may concern:*

Be it known that I, HERMAN FRASCH, of the city of Cleveland, in the county of Cuyahoga and State of Ohio, have invented a new and useful Improvement in Compositions for Purifying Canadian or Similar Petroleum and Processes of Making Such Compositions; and I do hereby declare the following to be a full, clear, and exact description thereof.

This invention relates to a new composition of matter for use in the purification of that class of petroleum distinguished by the presence of sulphur compounds which resist the ordinary treatment for the removal of sulphur, which give to the oil a peculiarly disagreeable and penetrating odor and which render the oil, even after ordinary distillation and the regular process of refining, unfit for ordinary use, owing to the formation, when the oil is burned, of offensive compounds and of sulphuric acid. Even when the disagreeable odor has been removed from the oil by the treatment with plumbate of soda followed by sulphur, the odor in this class of oil is revived on distillation. The sulphur compounds of this class of oil have received among workers therein the suggestive name of "skunk." This petroleum contains sulphur in large proportions, generally over one-half of one per cent., and being found in Canada and also at Lima, in the State of Ohio, is generally known as Canadian oil or as Lima oil.

As already intimated, there is a process in use for refining and deodorizing these petroleums, which removes the disagreeable odor for a time at least, but this process does not desulphurize the oil, as is manifest from the fact that such refined oil when burned gives off sulphuric acid, smokes the chimneys of the lamps, and if the light is allowed to burn low or is blown out, an exceedingly disgusting smell is produced. One characteristic of these petroleums is that the sulphur compounds termed "skunk" impart thereto the property of dissolving lead oxide in considerable proportions.

I have invented a process for desulphurizing and deodorizing Canadian and Lima oils, which destroys or removes the sulphur compounds so effectually that the oil is not only temporarily but permanently freed from the offensive odor, which, therefore, is not revived on burning or redistilling. For this process I obtained Letters Patent No. 378,246, dated February 21, 1888, and I have also invented other or further improvements in desulphurizing and deodorizing these oils, which form the subject matter of pending applications for Letters Patent. These improvements are based partly on a discovery I have made that these stinking oils are best purified from sulphur by subjecting the vapors of distillation to the action of the oxides of lead and certain other metals, or of certain other metallic compounds, and partly on a discovery made by me that when the purifying compound is mixed with the oil in the still before or during distillation, or with oil or resinous liquid in a purifier for the treatment of the vapors, the process is greatly aided by not only mixing the purifying compound with the oil, but by producing and maintaining during the process of distillation a condition of super-saturation of the oil with the purifying compound or a compound containing the purifying agents, by which I mean not only dissolving in the oil in the still as much of the oxide or active agent as will be held in solution, but also maintaining this condition of saturated solution by keeping an excess of the compound in the oil at all times in a condition of minute division or comminution, and keeping up a constant agitation of the mixture of the oil and purifying compound so as to induce a thorough contact of the nascent oil vapors with these floating particles, and consequently, the most rapid, ready and thorough decomposition of the sulphur compounds. These features being the subjects of other inventions, which I propose to patent so far as not covered by my patent before referred to, I do not here claim, but reserve as the subject matter of other applications. I refer to them here in order to the better understanding of my present invention.

The present invention consists in a new composition of matter designed and specially prepared to be used for the purpose of removing or decomposing the sulphur compounds termed "skunk" in these stinking petroleum oils. This composition of matter which I have invented consists of lead oxide and copper oxide, both of which are in a condition of velvety fineness and permeability and dissolve in the impure or "skunk"-bearing Canadian or Lima oils much more readily than commercial lead and copper oxides and are very active in destroying the sulphur compounds therein, in connection with a less active or an inactive pulverulent substance or carrier, and is in a finely divided form or powder, each of whose grains even when very fine, contains the three ingredients; but I may, in connection with the less active or the inactive substance or carrier, use lead oxide alone, or copper oxide alone, or more generally any one or more of the oxidating oxides, soluble in "skunk"-bearing oil and being in a state of velvety fineness and permeability, and the invention includes generally such a composition or material, as well as the special composition containing the oxides of lead and of copper (either or both).

By oxidating oxides I mean those of metals which give up their oxygen with comparative readiness, so as to form metallic sulphur compounds in the Canadian or Lima oil to be purified. They include in general the oxides of heavy metals or those which are precipitated as sulphides from their solutions (acid or alkaline) by sulphureted hydrogen, and are for the purposes of the present invention especially those of metals which form sulphides convertible into oxides by roasting and oxidation. The oxides of lead, bismuth, cadmium, mercury, copper, and silver, also binoxide of manganese, are the more active of the oxidating oxides; the ferric, stannic, and antimonic oxides, and the oxides of nickel, cobalt and zinc are less active, and so also are manganous oxide and the oxides of palladium and rhodium. By the use of this material or composition, I am enabled to maintain a large bulk of material in fine particles diffused through the oil or liquid in the still or purifier, with a smaller quantity of active oxide, since this composition, while it is only in part composed of the active oxide or oxides, yet has the latter present in each grain, and consequently carries the same to every part of the oil or liquid as if only the active oxides were used as the purifying compound. The presence of the less active or the inactive substance or carrier does not impede the action of the more active oxide, but appears rather to favor it by spreading it out or subdividing it. I prefer to use oxide of iron (say ground up iron ore) as the carrier, for one reason, because of its partial activity in removing or destroying the sulphur compounds in the oil, but I may use plaster or any refractory pulverulent substance or substances.

I secure the presence of the oxides of lead and of copper (either or both), or of other active oxide or oxides, in each grain of my new material or composition, by a deposition or precipitation on the carrier, of the metal or metals, from a suitable metallic solution in contact with such carrier in a finely divided condition; say for example, a solution in an oily solvent such as formed by dissolving an active oxide or oxides in impure Canadian or Lima oil and I secure the best results by keeping the said carrier in suspension in the solution during a gradual precipitation or deposition of the metal or metals.

I use the words precipitation or deposition of the metals, not as requiring the deposition in a free state but, in a general way as including the deposition whether in chemical combination or in a free state or partly in one and partly in another of these conditions.

Practically I effect the deposition in the form of metallic sulphur compounds, in the operation of removing the sulphur compounds termed "skunk" from the Canadian or Lima oil, and these metallic sulphur compounds I afterward convert or revivify by roasting and oxidation into metallic oxides, and thus produce my new composition to be used in removing the sulphur compounds from a fresh lot of oil.

It is often desirable to use more than one of the active metallic oxides. Thus, for example, I have stated above that my new composition consists of lead oxide and copper oxide in connection with the less active iron oxide or the inactive plaster, or with other refractory pulverulent substance, or carrier. One advantage of the combined use of these two oxides is found in the fact that lead oxide acts upon the sulphur compounds of the oil readily at comparatively low temperatures, and this is very useful in refining the lighter vapors; but with the increase of temperature it tends to become reduced to the metallic state, in which condition it is less effective, so that it is not so well suited to the purification of the heavier vapors; while on the other hand, copper oxide is more active at the higher temperatures and is not apt, or not so apt, to become reduced to the metallic state.

By the combination of the two oxides I produce a material or composition well adapted to the varying character of the vapors which are given off during a run. It is evident that this utility is secured when the less active or the inactive iron oxide or plaster or other carrier is absent, as well as when it is present; and it is further evident that by having a powder, each grain or granule of which carries the two oxides, I secure the thorough and equal action of both oxides on all parts of the vapors. For the same or other reason, it may be desired to combine other (whether two or more) of the active oxides with each other, and in that case, it is advantageous to have them in the form of a powder or finely divided material, in each grain of which the two (or more) oxides are present in a condition ready for action.

My invention extends to a purifying material or composition in which two or more of the active oxides are thus combined with each other with or without a less active or an inactive pulverulent substance. The required combination is secured in either case by deposition or precipitation, as before described.

In the foregoing description the operation of the material or composition has been considered more particularly with reference to the process of removing the sulphur compounds from the oil; but in practice the ready conversion of the metallic sulphur compounds into oxides by roasting and oxidation is a highly important feature, and my invention secures important advantages with respect to such conversion. Thus, for example, the result of precipitation or deposition of the metallic sulphur compound or compounds on or in each grain of the carrier, is to facilitate the roasting and oxidation, by subdividing the metallic compounds, so that they are more thoroughly exposed to the reducing and oxidating agents, while the said less active or inactive substance or carrier acts to store and keep up the heat in all parts of the metals undergoing the revivification or conversion. The like advantage would also be secured with a material which was active, provided it had not in fact been converted into a sulphur compound. It is with reference to this roasting and oxidating process that the carrier has been defined above as being refractory; for in industrial working it must be able to withstand the high temperature used in this process. Moreover, the sulphur compounds from the different active oxides are not in equal degree amenable to conversion into oxides by roasting and oxidation.

To facilitate the roasting and oxidation, it is or may be useful to combine them with other metallic compounds; thus, for example, if lead oxide alone be used to remove the sulphur compounds from the Canadian or similar oils, the sulphur compound of lead which is produced is with difficulty roasted and oxidated; and while the roasting and oxidation are facilitated by treating the oil with lead oxide in connection with an inert substance like plaster, so as to have the latter combined with the sulphur compound of lead to be roasted and oxidated, yet the operation is still somewhat difficult for industrial working; but if copper oxide, or, better, copper and iron oxides be used with the lead oxide in treating the oil, the roasting and oxidation are readily effected, for the copper and iron have at temperatures below a red heat a greater affinity for sulphur than lead has, and facilitate the desulphurizing of the lead. Iron oxide could be used alone, also manganese oxide or zinc oxide; or any two or more oxides of metals having an affinity for sulphur as stated above.

The precipitate or solid residue from my oxide treatment of oils of the Canadian and Lima class, contains not only metal and sulphur but also hydrocarbon in chemical combination, or at least a very close union, with the metal and sulphur, since in my experience it has not been separated therefrom by washing the residue with benzine, as would be expected if it were merely in mechanical admixture therewith. In roasting the residue, this hydrocarbon burns and subjects every part of the mass to the action of heat and the products of combustion; and the removal of said hydrocarbon leaves the metal in the most favorable condition to be converted into oxide when exposed to an oxidating atmosphere. This is true even if a single active oxide is employed in the purification, with or without iron oxide, plaster or other pulverulent inactive or less active refractory substance, as well as when two or more of the active oxides are used with or without such substance, and my invention covers generally the roasted and oxidated (reoxidized and desulphurized) deposit or precipitate composed of or containing one or more of the said metallic oxides in a state of velvety fineness and permeability, the material or composition itself being in a comminuted condition.

The compound of hydrocarbon metal and sulphur can be obtained isolated by forming a clear solution in unpurified Canadian or Lima oil of lead or copper oxide or other suitable oxidating oxide, and then distilling the solution, collecting the precipitate on a filter and washing the same with petroleum benzine. If desired two or more active oxides may be dissolved, the solution distilled and the precipitate collected and washed with benzine, in which case the resulting material will contain the different metals in combination with the other elements of the compound.

In practical working, it is preferred to maintain an excess of active oxide in the oil as well as a less active or inactive substance or carrier as hereinbefore described, and it is also preferred not to attempt the complete removal of the adhering hydrocarbon from the solid residue; consequently the hydrocarbon-metal-sulphur compound is practically procured in admixture with more or less of the active oxide and the carrier, and having more or less of free hydrocarbon adherent thereto. These adhering portions I utilize to furnish fuel in the roasting and oxidating process.

The following particular description will enable those skilled in the art to practice my invention, reference being had to the accompanying drawing which forms part of this specification, and which is a view in vertical section of a suitable roasting and oxidating apparatus.

Assuming that a common still is used, of a size suitable to distil, eighty-five barrels of oil and provided with a mechanical agitator to keep the solid material in suspension therein, twelve hundred pounds of copper oxide, six hundred pounds of plumbic oxide, and twelve hundred pounds of iron oxide (ground-up red hematite iron-ore will answer) or plaster of paris all in powder are put into the still with eighty-five barrels of the "skunk" bearing Lima oil (or other oil of that class), of which fifteen per cent. may be heavy oil and the remainder lighter or burning oil distillate. The agitator is then put in motion, the fire started, and the lighter oil is distilled off. During the distillation, oxides of copper and lead (with a smaller proportion of iron oxide) are dissolved in the oil and precipitated or deposited mostly, if not wholly, on or in the grains of solid matter which are kept in suspension by the agitator. As precipitation or deposition proceeds, fresh oxides are dissolved, and so solution and precipitation or deposition go on during the operation. When all the lighter oil has been distilled off, a supply of fresh oil can be added, since the oxides are not used up, but whether these are all used up or not, the whole or a portion of the residue can be removed from the still, and, after being placed in a strainer to drain, can be roasted and oxidated.

The roasting and oxidation are preferably performed in the apparatus shown in the accompanying drawing.

The furnace may be made of any convenient dimensions, and consists of a structure of brick or other suitable material the inside being lined with refractory material, such as fire brick, calculated to resist the heat. The furnace is closed at top, and bottom, and on the two sides, excepting that in the roof $a$ of the furnace is placed a hopper $b$, covered by a door, through which the dried residuum is introduced; and also that a chimney $c$ communicates with the interior of the furnace through the roof, to conduct away the sulphur dioxide and products of combustion of the hydrocarbon. The interior of the furnace has a series of horizontal partitions $d, d$, constructed of fire brick, which extend entirely across but not quite to the end of the furnace, thus forming a series of communicating chambers $e, e$, &c., one above the other, the passage from one chamber to the other being alternately at opposite ends of the furnace. The lowest partition $d'$ covers entirely the fire chamber $f$, there being no passage way to the chamber $e$ above it, excepting through a short flue $i$ or flues formed in the rear wall of the furnace, which flue or flues extend from the top of the rear end of the fire chamber $f$ to the upper part of the chamber $e$ immediately above it, as shown by dotted lines in the drawing.

At each end of the fire chamber $f$, as well as at each end of each chamber $e$, is an opening in the wall covered by a sliding iron door $h$, each door being hooked onto a horizontal bar $k$, placed above the doorway or opening, the door inclining outward at the bottom so as to cause it to fit closely against the door frame when closed. The doors however are not intended to be air tight, as it is desirable that sufficient air should enter around the edges of the closed doors to maintain an oxidizing atmosphere within each of the chambers $e, e$, &c., of the furnace. One door of the fire chamber $f$ is usually partially open, and should be open sufficiently to furnish air for the combustion of the hydrocarbon and sulphur.

The operation of this furnace is as follows: The slushy residuum from which the excess of petroleum has been drained, as before stated, is thrown into the lowest chamber $f$ or fire chamber of the furnace, and when the furnace is first started, is ignited; this furnishes the only fuel used. The sulphur dioxide and products of combustion pass through the short flue or flues $i$, from the fire chamber $f$ to the first oxidizing chamber $e$, and thence, following the course of the arrows through the several oxidizing chambers $e, e$, &c., to and out of the chimney $c$. When the residuum in the fire chamber $f$ is dry, by the burning out and evaporation of the petroleum, the doors at each end of the fire chamber $f$ are opened, the dried residuum, now partially oxidized, is pushed out through the rear door, and fresh residuum is inserted through the front door to take its place; the rear door is then closed and the front door partially closed. The dried residuum is then thrown into an elevator and raised to and dumped into the top of the furnace through the hopper $b$, falling onto the floor of the top oxidizing chamber $e$, on which it is from time to time spread by a workman with a tool introduced through either the front or rear door of the chamber, and the stuff near the rear end is drawn backward and falls onto the floor of the second chamber $e$, the workman drawing the stuff and causing it to drop from one chamber to the chamber next below it and keeping it spread over the floors of the chambers so as to expose it to the heat and oxidizing atmosphere of the furnace, until it reaches the lowest oxidizing chamber $e'$, from either end of which it may be drawn, as the floor of that chamber has no opening into the fire chamber $f$, excepting through the short flue or flues $i$, which are so constructed as to be sufficiently above the level of the floor to prevent the stuff from passing into them. When the residuum is finally drawn from the lowest oxidizing chamber, it is thoroughly reoxidized and desulphurized by the roasting and oxidation, and it is then thrown into a tumbling barrel for the purpose of separating the particles of matter which adhere together, and it is then passed through a bolting machine, after which it is ready for use, the active metallic oxides being in a condition of velvety fineness and extreme permeability or susceptibility to the dissolving power of "skunk"-bearing oil.

The new compound can be used in purifying the oil from its sulphur compounds by acting on the vapors after they have been given off from the body of oil in distillation as well as by introduction into the oil under treatment, and I need not of course operate in the still in order to precipitate or deposit the lead and copper for this operation may be performed in a purifier containing say oil or resinous liquid and oxides of lead and copper in solution or solution and suspension in said oil or resinous liquid through which the oil vapors are passed.

If plaster or other inert material were used for iron oxide, or if lead oxide or copper oxide were used in place of both, or if other oxides were used, my new materials or compositions would be obtained, modified in like manner.

I claim herein as my invention—

1. The herein described new composition for removing sulphur compounds from Canadian and similar "skunk"-bearing oil, consisting of one or more metallic oxides soluble in such oil (as the oxides of lead and copper) in a finely divided form on or in particles of a comminuted refractory carrier or vehicle, said composition being characterized by practical homogeneity, in consequence of the presence together of the said metallic oxide and the said carrier or vehicle in the individual fine grains or granules of the composition, and also by the velvety fineness and permeability of the said metallic oxide, substantially as described.

2. The herein described new composition for removing sulphur compounds from Canadian and similar "skunk"-bearing oil, the same being in a comminuted condition and composed of or containing one or more metallic oxides soluble in such oil in the form of a reoxidized and desulphurized deposit or precipitate in or from an oily or resinous menstruum, and being characterized by the velvety fineness and permeability of the said oxide, substantially as described.

3. The process of making a composition for removing sulphur compounds from Canadian and similar "skunk"-bearing oil, consisting in forming an oily or resinous solution of one or more metallic oxides soluble in "skunk"-bearing oil, precipitating or depositing from such solution a sulphur compound or compounds of the metal or metals of said oxide or oxides, and subsequently converting such precipitate or deposit into oxide by oxidation and desulphuration, substantially as described.

4. The process of making a composition for removing sulphur compounds from Canadian and similar "skunk"-bearing oil, consisting in forming an oily or resinous solution of one or more metallic oxides soluble in "skunk"-bearing oil, precipitating or depositing a metallic sulphur compound or compounds from such solution on or in a refractory comminuted substance or substances, and subsequently converting such precipitate or deposit into oxide by the exposure to an oxidating atmosphere at an elevated temperature of the mixture or composition containing the said sulphur compound or compounds in intimate admixture or union with said refractory substance or substances, substantially as described.

In testimony whereof I have hereunto set my hand this 18th day of August, A. D. 1888.

HERMAN FRASCH.

Witnesses:
W. A. GALPIN,
H. E. HIGGINS.